US010061275B2

(12) United States Patent
El-Shaer et al.

(10) Patent No.: US 10,061,275 B2
(45) Date of Patent: Aug. 28, 2018

(54) OPTIMIZED PARAMETERIZATION OF ACTIVE DISTURBANCE REJECTION CONTROL

(71) Applicant: LINESTREAM TECHNOLOGIES, Cleveland, OH (US)

(72) Inventors: Ahmed El-Shaer, Lansdale, PA (US); Gang Tian, Westlake, OH (US); Girish Yajurvedi, Lakewood, OH (US)

(73) Assignee: LINESTREAM TECHNOLOGIES, Cleveland, OH (US)

( * ) Notice: Subject to any disclaimer, the term of this patent is extended or adjusted under 35 U.S.C. 154(b) by 510 days.

(21) Appl. No.: 14/445,345

(22) Filed: Jul. 29, 2014

(65) Prior Publication Data

US 2016/0033944 A1   Feb. 4, 2016

(51) Int. Cl.
    *G05B 13/02*   (2006.01)
    *G05B 19/416*  (2006.01)

(52) U.S. Cl.
    CPC ......... *G05B 13/024* (2013.01); *G05B 19/416* (2013.01); *G05B 2219/41025* (2013.01)

(58) Field of Classification Search
    None
    See application file for complete search history.

(56) References Cited

U.S. PATENT DOCUMENTS

| | | |
|---|---|---|
| 3,543,010 A | 11/1970 | Dahlin |
| 3,786,242 A | 1/1974 | Brooks |
| 3,826,887 A | 7/1974 | Pemberton |

(Continued)

FOREIGN PATENT DOCUMENTS

| | | |
|---|---|---|
| EP | 0827265 | 4/2002 |
| JP | 2002-023807 | 1/2002 |

(Continued)

OTHER PUBLICATIONS

International Search Report & Written Opinion for PCT Application Serial No. PCT/US2015/041670, dated Nov. 27, 2015, 12 pages.

(Continued)

*Primary Examiner* — Jason Lin
(74) *Attorney, Agent, or Firm* — Amin, Turocy & Watson LLP

(57) ABSTRACT

A system for tuning a control system uses a simplified tuning procedure to generate robustly stabilizing tuning parameters that reduce or eliminate undesired system oscillations in the presence of long system dead times or phase lag. A control method is used to establish a relationship between the plant parameters of a controlled system and the tuning parameters of a parameterized active disturbance rejection controller determined to be optimal or substantially optimal for the control system. The plant parameters include the system gain, time constant, and dead time. Corresponding tuning parameters include the controller bandwidth and a system gain estimate. Using the system gain estimate as a tuning parameter can alleviate the influence of large dead times or phase lags on system response. Once established, these fixed relationships can be used to determine suitable tuning parameters for specific motion or process control applications based on the system gain and dominant constraints of the system.

20 Claims, 13 Drawing Sheets

(56) References Cited

U.S. PATENT DOCUMENTS

| | | |
|---|---|---|
| 4,481,567 A | 11/1984 | Kaya et al. |
| 4,540,923 A | 9/1985 | Kade et al. |
| 4,768,143 A | 8/1988 | Lane et al. |
| 5,159,254 A | 10/1992 | Teshima |
| 5,229,699 A | 7/1993 | Chu et al. |
| 5,306,994 A * | 4/1994 | Supino ............... G05B 13/0225 318/561 |
| 5,315,521 A * | 5/1994 | Hanson ............... B01J 19/0033 700/103 |
| 5,568,377 A | 10/1996 | Seem et al. |
| 5,602,347 A | 2/1997 | Matsubara et al. |
| 5,684,375 A | 11/1997 | Chaffee et al. |
| 5,742,503 A | 4/1998 | Yu |
| 5,920,478 A * | 7/1999 | Ekblad ................... G05B 11/32 318/139 |
| 6,037,736 A | 3/2000 | Tsuruta et al. |
| 6,122,555 A | 9/2000 | Lu |
| 6,128,541 A | 10/2000 | Junk |
| 6,198,246 B1 | 3/2001 | Yutkowitz |
| 6,445,962 B1 | 9/2002 | Blevins et al. |
| 6,495,791 B2 | 9/2002 | Sawatsky et al. |
| 6,510,353 B1 * | 1/2003 | Gudaz ............... G05B 19/0428 700/37 |
| 6,546,295 B1 | 4/2003 | Pyotsia et al. |
| 6,564,194 B1 | 5/2003 | Koza et al. |
| 6,611,125 B2 | 8/2003 | Nagata et al. |
| 6,631,299 B1 | 10/2003 | Patel et al. |
| 6,658,305 B1 | 12/2003 | Gudmundsson et al. |
| 6,980,869 B1 | 12/2005 | Chandhoke |
| 7,024,253 B2 | 4/2006 | Gaikwad et al. |
| 7,117,186 B2 * | 10/2006 | Koza ..................... G05B 11/42 706/13 |
| 7,149,591 B2 | 12/2006 | Gao et al. |
| 7,289,915 B2 | 10/2007 | Ide |
| 7,346,402 B1 | 3/2008 | Stahl |
| 7,449,857 B2 | 11/2008 | Oha et al. |
| 7,865,254 B2 | 1/2011 | Gahinet et al. |
| 8,041,436 B2 | 10/2011 | Gao |
| 8,060,340 B2 | 11/2011 | Gao et al. |
| 8,146,402 B2 | 4/2012 | Collins et al. |
| 8,644,962 B2 * | 2/2014 | Kelly ................... G05B 13/024 323/207 |
| 8,838,257 B1 * | 9/2014 | Ito ......................... G11B 19/28 360/78.05 |
| 2002/0156541 A1 * | 10/2002 | Yutkowitz ............ G05B 11/28 700/28 |
| 2003/0028266 A1 * | 2/2003 | Jacques ............... G05B 13/042 700/32 |
| 2003/0139825 A1 | 7/2003 | Lund |
| 2004/0030414 A1 * | 2/2004 | Koza ..................... G05B 11/42 700/1 |
| 2005/0034538 A1 | 2/2005 | Rehm et al. |
| 2007/0073422 A1 | 3/2007 | Gaikwad et al. |
| 2007/0075670 A1 | 4/2007 | Akiyama |
| 2007/0088448 A1 | 4/2007 | Mylaraswamy et al. |
| 2007/0268068 A1 * | 11/2007 | Yutkowitz ............ G05B 13/042 329/325 |
| 2008/0203960 A1 | 8/2008 | Golownia et al. |
| 2009/0005886 A1 * | 1/2009 | Gao ........................ G05B 5/01 700/29 |
| 2009/0112335 A1 * | 4/2009 | Mehta ................... G05B 13/048 700/29 |
| 2009/0143871 A1 * | 6/2009 | Gao ....................... G05B 13/04 700/29 |
| 2010/0057223 A1 * | 3/2010 | Kelly ..................... G05B 21/02 700/33 |
| 2010/0138004 A1 | 6/2010 | Chia et al. |
| 2010/0292813 A1 | 11/2010 | Boiko et al. |
| 2012/0170639 A1 | 7/2012 | Salsbury |
| 2013/0110262 A1 * | 5/2013 | Abramovitch ......... B82Y 35/00 700/42 |
| 2013/0278196 A1 | 10/2013 | Tian |
| 2013/0307459 A1 | 11/2013 | Tian |
| 2014/0139170 A1 | 5/2014 | Tian |

FOREIGN PATENT DOCUMENTS

| | | |
|---|---|---|
| JP | 2006-333570 | 12/2006 |
| JP | 2009-184095 | 8/2009 |
| JP | 2011-072178 | 4/2011 |
| JP | 2012-230701 | 11/2012 |
| KR | 10-1121474 | 1/2012 |
| WO | 0041043 A1 | 7/2000 |

OTHER PUBLICATIONS

Edwards. "Modeling and Feedback Control of a MEMS Electrostatic Actuator", 2009, Master of Science in Electrical Engineering at the Cleveland State University, 200 Pages, (https://etd.ohiolink.edu/ap/10?0: :N0:10:P10_ACCESSION_NUM:csu1247583924), See pp. 54-148.

John J. Grefenstette. "Optimization of Control Parameters for Genetic Algorithms", IEEE Transactions on Systems, Man and Cybernetics, pp. 122-128, vol. SMC-16, No. 1, Jan./Feb. 1986.

Aaron Radke. "On Disturbance Estimation and Its Applications in Health Monitoring", Dissertation submitted to Cleveland State University, Cleveland, Ohio, USA, UMI Microform 3244865, Dec. 2006, 147 pgs.

U.S. Office Action for U.S. Appl. No. 10/351,664 dated Sep. 8, 2006.

U.S. Office Action for U.S. Appl. No. 10/351,664 dated May 1, 2007.

U.S. Office Action for U.S. Appl. No. 10/351,664 dated Nov. 14, 2007.

U.S. Office Action for U.S. Appl. No. 10/351,664 dated Nov. 21, 2008.

U.S. Office Action for U.S. Appl. No. 10/351,664 dated Jul. 31, 2009.

U.S. Office Action for U.S. Appl. No. 10/351,664 dated Apr. 12, 2010.

U.S. Office Action for U.S. Appl. No. 10/351,664 dated Mar. 3, 2011.

Aaron, "Synthesis of Feedback Control Systems by Means of Pole and Zero Location of the Closed Loop Function". AIEE Transactions, 1951, vol. 70, 8 pages.

Gao, et al., "A Novel Motion Control Design Approach Based on Active Disturbance Rejection". Proceedings of the 40th IEEE Conference on Decision and Control, Orlando, Florida USA, Dec. 2001, 0-7803-7061-9/01 (c)2001 IEEE, 6 pages.

Ghanekar, et al., "Scaling Laws for Frequency Domain Controllers of Dynamically Equivalent Single Flexible Link Manipulators". IEEE International Conference on Robotics and Automation, 0-7803-1965-6/95 (c)1995 IEEE, 6 pages.

Ghanekar, et al., "Scaling Laws for Linear Controllers of Flexible Link Manipulators Characterized by Nondimensional Groups". IEEE Transactions on Robotics and Automation, vol. 13, No. 1, Feb. 1997, 1042-296X/97 (c)1997 IEEE, 11 pages.

Suh, et al., "New PID Identification Algorithm Based on Frequency Scaling", 0-7803-3694-1/97 (c)1997 IEEE, 5 pages.

Korean Office Action dated Oct. 16, 2013 for Korean Patent Application No. 10-2012-0113619, 3 pages.

International Search Report and Written Opinion dated Oct. 11, 2013 for International Application No. PCT/US13/37122, 30 pages.

U.S. Office Action for U.S. Appl. No. 13/451,924 dated Jul. 3, 2013, 31 pages.

Korean Notice of Allowance dated Dec. 23, 2013 for Korean Patent Application No. 10-2012-0113619, 5 pages.

U.S. Office Action for U.S. Appl. No. 13/474,919 dated Apr. 10, 2014.

Wan Ha, et al, A Complete Solution to Asymmetric S-curve Motion Profile: Theory & Experiments, International Conference on Control, Automation and Systems 2008.

(56) References Cited

OTHER PUBLICATIONS

Extended European Search Report issued by the European Patent Office dated Feb. 8, 2018, in connection with European Patent Application No. 15826637.9, 8 pages.
Kravaris et al., "Deadtime Compensation for Nonlinear Processes", AI CH E JOU, John Wiley & Sons, Inc, US, vol. 35, No. 9, Sep. 1, 1989, pp. 1535-1541.

* cited by examiner

OPTIMIZED PARAMETERIZATION OF ACTIVE DISTURBANCE REJECTION CONTROL

TECHNICAL FIELD

This disclosure generally relates to motion control, and specifically to automatic determination of tuning parameters for a control system given a system gain and dominant constraints of the system.

BACKGROUND

Many automation applications employ motion control systems to control machine position and speed. Such motion control systems typically include one or more motors or other motion devices operating under the guidance of a controller, which sends position or speed control instructions to the motor in accordance with a user-defined control algorithm. Some motion control systems operate in a closed-loop configuration, whereby the controller instructs the motor to move to a target position or to transition to a target velocity (a desired state) and receives feedback information indicating an actual state of the motor. The controller monitors the feedback information to determine whether the motor has reached the target position or velocity, and adjusts the control signal to correct errors between the actual state and the desired state. Similar control techniques are also used in process control applications. In such applications, the control signal generated by the controller regulates one or more process variables in accordance with a control algorithm, and a measured value of the process variable is provided to the controller as feedback, allowing the controller to adjust the control signal as needed based on the actual value of the process variable relative to a desired setpoint.

Designers of motion control and process control systems seek to achieve an optimal trade-off between performance and system stability. For example, an aggressively tuned controller may result in a system that tracks a desired position with high accuracy and a fast response time, but may be rendered unstable in the presence of system noise and uncertainties. Alternatively, tuning the controller more conservatively will improve system stability, but at the expense of performance. Ideally, the controller gain coefficients should be selected to optimize this trade-off between performance and system stability. The process of selecting suitable gain coefficients for the controller is known as tuning.

Turning the gain coefficients for a controller determines the controller's bandwidth, which is a measure of responsiveness of the controlled system to changes in the control signal. The response of the controlled system to a signal from a controller is partially a function of the controller's bandwidth and the physical characteristics of the controlled system (e.g., inertia, damping, friction, coupling stiffness, phase lag, etc.). In general, higher controller bandwidths will result in faster output response to control signals, better disturbance rejection, and smaller tracking error. However, setting the bandwidth too high can introduce system instability by rendering the system more sensitive to noise and reducing closed-loop robustness (the ability of the system to remain stable over a range of reasonable system uncertainties and disturbances), particularly in the presence of inherently uncertain motor-load dynamics. For example, for lightly damped motion systems, excessively high controller bandwidth can over-excite the system resulting in undesirable oscillations, which in turn may cause controller saturation as the controller attempts to stabilize the resulting oscillations. The system can be rendered more stable by reducing the controller bandwidth, but at the expense of performance. For at least these reasons, tuning parameters for a given motion control system must be carefully selected to achieve robust performance and robust stability.

Adding to these difficulties in achieving optimal controller tuning, some mechanical systems or processes are designed such that there is a considerable delay—known as dead time—between issuance of a control command by the controller and a corresponding system response. Systems with high dead time or phase lag often experience undesirable oscillations in response to disturbances or setpoint changes, resulting in degraded performance and rendering the tuning of such systems more difficult.

The foregoing is merely intended to provide an overview of some of the challenges facing conventional motion and process control systems. Other challenges with conventional systems and contrasting benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present some concepts of one or more embodiments in a simplified form as a prelude to the more detailed description that is presented later.

One or more embodiments of the present disclosure relate to systems and methods for automatically determining suitable tuning parameters for a control system given a known or estimated system dead time. The system is configured to generate substantially optimized tuning parameters that reduce or mitigate oscillations and other performance issues associated with large dead times or phase lags, while simplifying the tuning process by reducing the number of tuning parameters required to be set. To these and other ends, robust stability analysis is used to model a relationship between the tuning parameters and plant parameters, which can be obtained through calculation or system identification. Using this model, a suitable controller bandwidth and system gain estimate for a given motion or process control system can be determined automatically by providing the identified system parameters (e.g., system gain, dead time, and time constant) for the motion control system to the model, thereby providing substantially optimized tuning parameters more quickly relative to trial-and-error methods.

The following description and the annexed drawings set forth herein detail certain illustrative aspects of the one or more embodiments. These aspects are indicative, however, of but a few of the various ways in which the principles of various embodiments can be employed, and the described embodiments are intended to include all such aspects and their equivalents.

DETAILED DESCRIPTION

Figure 1:
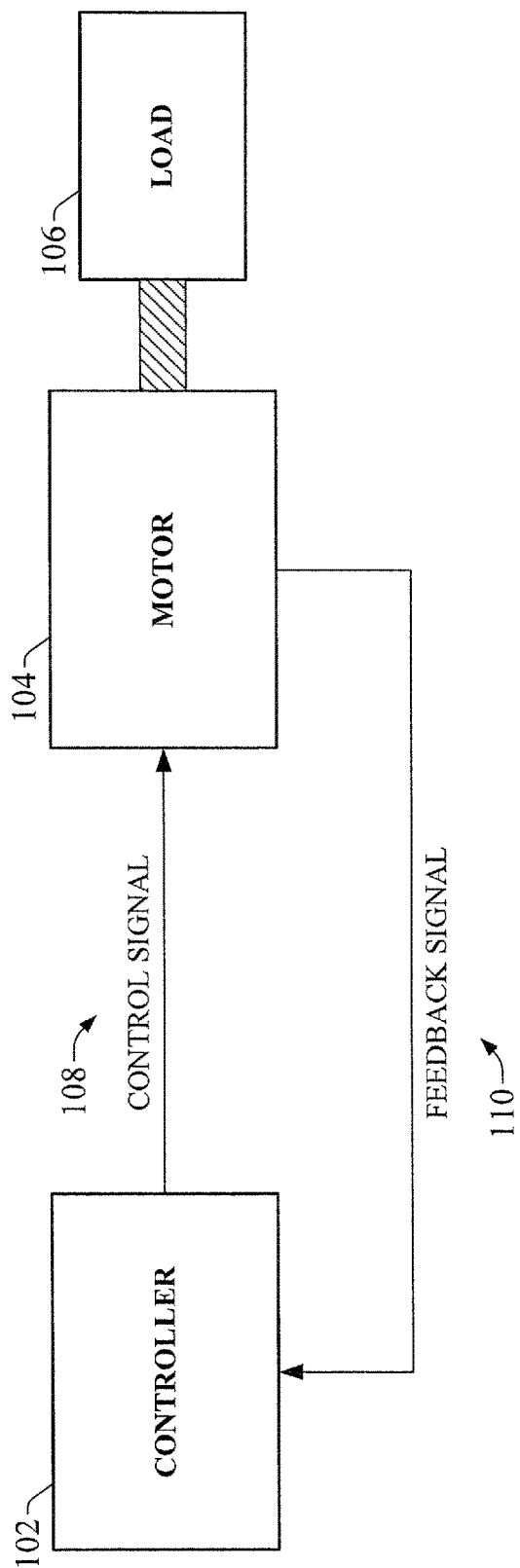
FIG. 1 is a block diagram of a simplified closed-loop motion control architecture.

Various embodiments are now described with reference to the drawings, wherein like reference numerals refer to like elements throughout. In the following description, for the purposes of explanation, numerous specific details are set forth in order to provide an understanding of this disclosure. It is emphasized, however, that such embodiments may be practiced without these specific details, or with other methods, components, materials, etc. In other instances, structures and devices are shown in block diagram form to facilitate describing one or more embodiments.

Systems and methods described herein relate to techniques for reducing or eliminating undesired oscillations in a controlled mechanical system using a simplified tuning procedure. According to one or more embodiments, a control method is used to establish a relationship between the plant parameters of a controlled system and tuning parameters of a parameterized active disturbance rejection controller determined to be optimal or substantially optimal for the controlled system. The plant parameters can include the system gain, time constant, and dead time of the system, such that identified system dead time is taken into account when establishing these relationships. The corresponding tuning parameters can include the controller bandwidth and a system gain estimate. Using the system gain estimate as a tuning parameter as described herein can alleviate the influence of dead time or phase lag on systems that are controlled using parameterized active disturbance rejection control principles.

Once established, these fixed relationships can be used to determine tuning parameters for specific motion control applications given the system parameters of the system. The techniques described herein can mitigate the need to tune the controller manually using trial-and-error methods, while enhancing performance by determining tuning parameters that mitigate undesired oscillations due to dead time or phase lag.

FIG. 1 depicts a simplified closed-loop motion control architecture. Although FIG. 1 illustrates an example motion control system, it is to be appreciated that the techniques described herein are also suitable for process control systems. Controller 102 is programmed to control motor 104, which drives mechanical load 106. Controller 102, motor 104, and load 106 comprise the primary components of an example motion control system. In an example application, load 106 can represent an axis of a robot or positioning system. In such applications, controller 102 sends control signal 108 instructing the motor 104 to move the load 106 to a desired position at a desired speed. The control signal 108 can be provided directly to the motor 104, or to a motor drive (not shown) that controls the power delivered to the motor 104 (and consequently the speed or position and direction of the motor). Feedback signal 110 indicates a current state (e.g., position, velocity, etc.) of the motor 104 and/or load 106 in real-time. In servo-driven systems, feedback signal 110 can be generated, for example, by an encoder or resolver (not shown) that tracks an absolute or relative position of the motor. In other types of systems, feedback signal 110 may originate from the load (e.g., via measurement of the load's position or speed). In sensorless systems lacking a position/velocity sensor, the feedback signal can be provided by a speed/position estimator. During a move operation, the controller monitors feedback signal 110 to ensure that the load 106 has accurately reached the target position. The controller 102 compares the actual position of the load as indicated by the feedback signal 110 with the target position, and adjusts the control signal 108 as needed to reduce or eliminate error between the actual and target positions.

In another example application, load 106 can represent a spinning load (e.g., a pump, spin dryer, a washing machine, a centrifuge, etc.) driven by motor 104, in which controller 102 controls the rotational velocity of the load. In this example, controller 102 provides an instruction to motor 104 (via control signal 108) to transition from a first velocity to a second velocity, and makes necessary adjustments to the control signal 108 based on feedback signal 110.

It is to be appreciated that the control tuning techniques described herein are not limited to use in the example types of motion control systems described above, but rather are applicable to substantially any type of motion control application, including but not limited to conveyor control, material handling (e.g., pick-and-place systems and the like), palletizer systems, web tension control, and other types of motion systems. The tuning techniques described herein are also applicable in process control systems, in which controller 102 regulates one or more process variables (e.g., temperature, pressure, flow, tank levels, etc.). Applicable process control applications include, but are not limited to, batch control applications (e.g., plastics, glass, paper, etc.), power control, waste water processing, oil refinement, etc.

The control signal output generated by the controller 102 in response to an error between the desired position or velocity and the target position or velocity (as reported by the feedback signal 110) depends on the controller bandwidth, which determines the gain coefficients for the control loop. In general, higher bandwidths result in better system performance (e.g., faster controller tracking and less sensitivity to external disturbances acting on the closed loop system). However, depending on the mechanical characteristics of the controlled mechanical system, setting the controller bandwidth too high can render the system unstable by, for example, resulting in undesirable system oscillations. Such oscillations can introduce instability, cause system delays, and consume excessive power as a result of the additional work required to bring the system to a stable state. Systems with a relatively high dead time (the time delay between issuance of a control command from controller 102 and observance of a response by the controlled system or process) are particularly susceptible to unwanted system oscillations. Examples of systems with high dead time include motor sensorless speed control applications in which a sensorless speed estimator introduces dead time, or process control applications in which certain process variables have an inherent high degree of dead time between receipt of a control signal and process variable response. Systems with large phase lags are also prone to system instability.

To address these and other issues, one or more embodiments of the present disclosure extend parameterized active disturbance rejection control (ADRC) principles to deal with systems having a high dead time or phase lag. To this end, a system gain estimate $b_0$, which reflects an actual value system gain bin a parameterized ADRC controller, is used as a tuning parameter to alleviate the influence of dead time or phase lag on systems controlled using parameterized ADRC. Conventionally, $b_0$ is used only as a system parameter. However, tuning techniques described herein are based on an observation that using $b_0$ as a tuning parameter can reduce undesired system oscillations due in part to relatively large dead times or phase lags. In order to facilitate fast and simple identification of a suitable system gain estimate $b_0$, as well as controller bandwidth $\omega_o$, for a given system with a high degree of time delay or phase lag, a relationship between optimal tuning parameters ($b_0$ and $\omega_o$) and system parameters is determined using robust stability analysis. This relationship is stored as a model (e.g., as an expression or lookup table) so that suitable tuning parameters that provide both accurate and stable performance can be generated given only the system gain and system parameters (including system dead time) of a given control application.

Formulation of parameterized ADRC control for an example $1^{st}$ order system is now described. Although parameterized ADRC control is described below in connection with an example $1^{st}$ order system, it is to be appreciated that embodiments of this disclosure are applicable to systems of any order.

A $1^{st}$ order system can be described as the following transfer function:

$$\dot{x} = ax + bu \quad (1)$$

$$y = x \quad (2)$$

where a and b are system parameters; and x, y, and u are system state, output, and input, respectively. The $1^{st}$ order system can be alternately described in transfer function form as follows:

$$G(s) = \frac{Y(s)}{U(s)} = \frac{k}{\tau s + 1} \quad (3)$$

where s is a Laplace Transform operator $$k = \frac{b}{a}$$

is a system gain, and $$\tau = \frac{1}{a}$$

is a time constant.

A parameterized ADRC control is designed to control the $1^{st}$ order system with the Extended State Observer (ESO):

$$\dot{z} = Az + Bu + L(y - Cz) \quad (4)$$

and the Control Law:

$$u = \frac{1}{b_0}(P(r - z_1) - z_2) \quad (5)$$

where $$z = \begin{bmatrix} z_1 \\ z_2 \end{bmatrix}$$

is an ESO state vector, matrix $$A = \begin{bmatrix} 0 & 1 \\ 0 & 0 \end{bmatrix},$$

matrix $$B = \begin{bmatrix} b_0 \\ 0 \end{bmatrix},$$

matrix $$L = \begin{bmatrix} 2\omega_o \\ \omega_o^2 \end{bmatrix},$$

matrix C=[1 0], P=$\omega_c$, $b_0$ is the identified value of b, and $\omega_o$ and $\omega_c$ are the observer and controller bandwidths, respectively. In accordance with ADRC, $\omega_o$ and $\omega_c$ are the tuning parameters of the ESO and the Control Law, respectively. In some embodiments, $\omega_o$ is configured to be equal to $\omega_c$. However, scenarios in which $\omega_o$ is not equal to $\omega_c$ are also within the scope of one or more embodiments of this disclosure.

As an alternative, the Control Law can also be represented by:

$$u = \frac{1}{b_0}(P(r-y) - z_2) \quad (6)$$

In order to take dead time or phase lag of the system into account, a 1$^{st}$ order system plus dead time (FOPDT) can be described as the following transfer function:

$$G(s) = \frac{k}{\tau s + 1} e^{-T_d s} \quad (7)$$

where $T_d$ is the dead time of the system, representing the delay between issuance of a control command and a corresponding system response.

Figure 2:
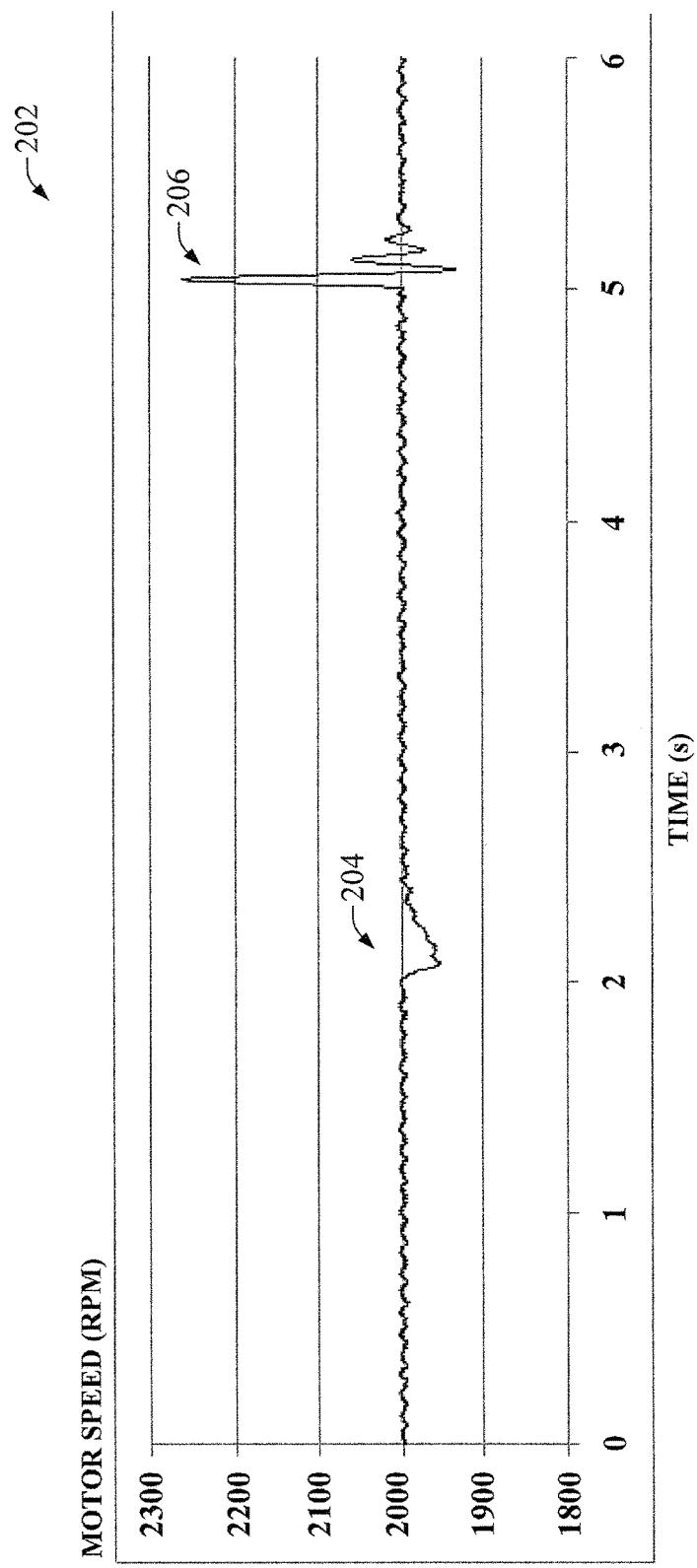
FIG. 2 is a graph depicting motor speed over time for an example sensorless motor control application.

Systems having a relatively large $T_d$ (long delay times) may experience undesirable oscillation behavior and degraded performance in some scenarios for certain ranges of τ when normal parameterized ARDC is used to control the system. FIG. 2 is a graph 202 depicting motor speed over time for an example sensorless motor control application. In this example, a normal parameterized ADRC controller is used with a sensorless estimator to control a permanent magnet sensorless motor (PMSM). The sensorless estimator introduces a large phase lag (that is, equivalent to a high value of T) on the system. At the two-second mark 204, a step disturbance is applied to the motor shaft, causing a momentary drop in motor speed that is quickly corrected for by the controller—e.g., by adjusting the torque control signal to the motor—to maintain the target speed of 2000 RPM. At the five-second mark 206, the step disturbance is removed from the motor. The sudden removal of the disturbance causes the motor speed to spike due to the increased torque control command that had been issued by the controller to compensate for the addition of the disturbance at the two-second mark. Although the controller is tuned for small speed errors, fast recovery time, and small oscillation, oscillations in motor speed are nevertheless observed as the controller attempts to recover from the sudden removal of the step disturbance. These oscillations are due in part to the system's relatively long dead time.

Figure 3:
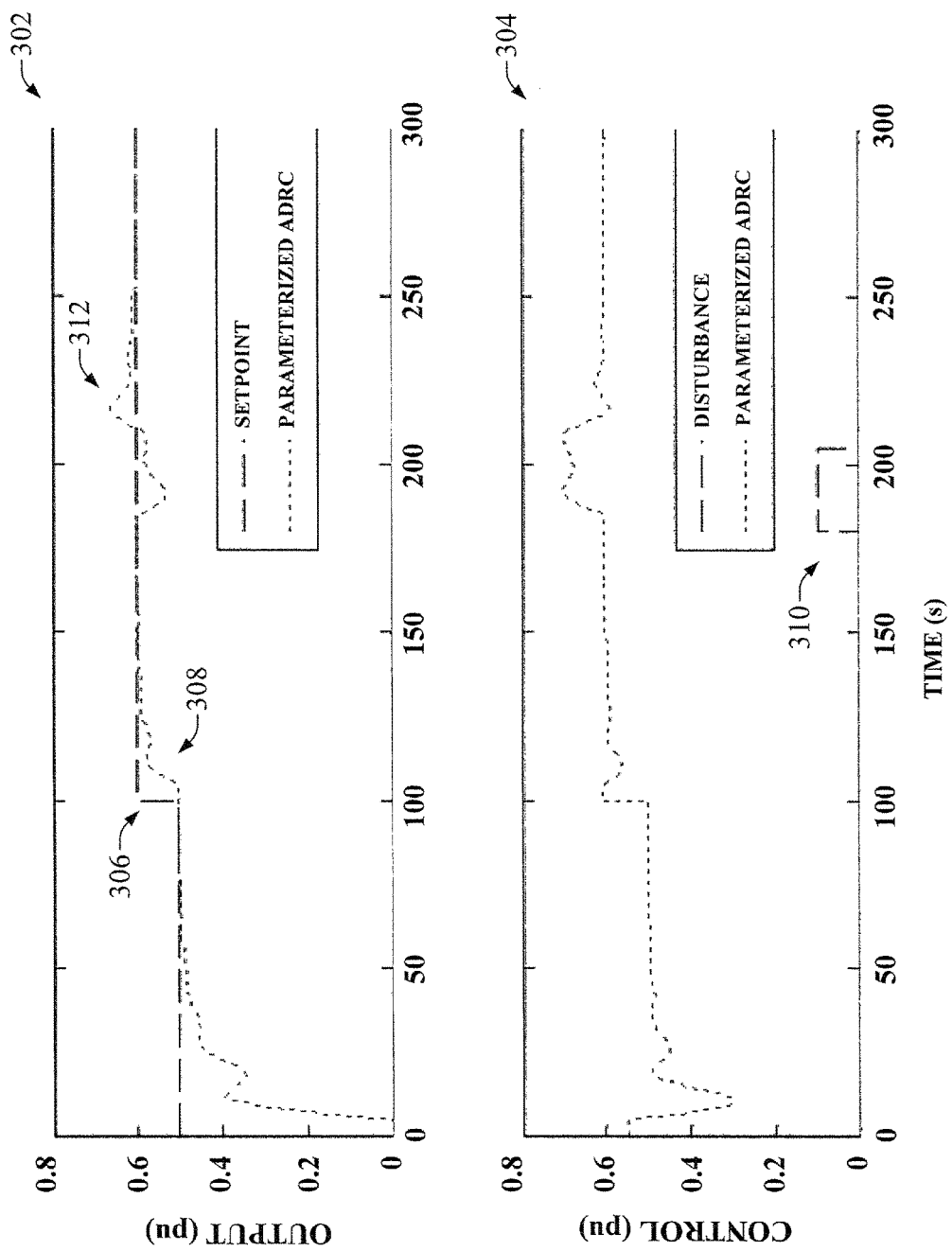
FIG. 3 is a pair of graphs depicting system output and control signal over time for a process control application.

Some process control applications are also susceptible to undesired oscillations due to excessive dead time or phase lag. FIG. 3 is a pair of graphs depicting system output and control signal over time for a process control application. The system output (represented by the dotted line of the output graph 302) may correspond, for example, to a process variable controlled by the control signal (represented by the dotted line in control graph 304). Graphs 302 and 304 plot data that was captured during a process control simulation of a 1$^{st}$ order plant with the time constant τ and dead time $T_d$ both equal to five seconds. In this example, a setpoint of 0.5 pu (per-unit) is set by the controller at the 0 second mark as shown in output graph 302. At the 100 second mark 306, the setpoint is increased to 0.6 pu, causing the control signal issued by the controller to increase as shown in control graph 304. As shown in output graph 302, the system output experiences oscillations 308 during the transition to the new setpoint value under normal parameterized ADRC control.

At the 180 second mark, a step disturbance 310 is applied on the system, and is removed at the 205 second mark. As with the setpoint change, oscillations 312 are induced on the system output as the normal parameterized ADRC controller attempts to return the process variable to the setpoint.

Embodiments of the present disclosure address the issue of oscillations due to relatively long dead times or phase lags based on an observation that adjusting the system gain estimate $b_0$ used in the ADRC control law (see equations (5) and (6) above) can influence these oscillations and improve performance. These principles are implemented by identifying and modeling a relationship between system parameters (system gain k, time constant τ, and dead time $T_d$) and suitable tuning parameters that result in robust stable performance, where the tuning parameters comprise the observer bandwidth $\omega_o$ and system gain estimate $b_0$. The relationship can be determined by applying robust control technique with the ratio between observer bandwidth $\omega_o$ and controller bandwidth $\omega_c$ kept constant. Curve-fitting methods can be applied to obtain a model (e.g., an expression or look-up table) of tuning parameter values for $\omega_o$ and $b_0$ with respect to arguments k, τ, and $T_d$. This model can then be stored and leveraged during operation to obtain suitable tuning parameters for a given control system by inputting system parameter values for the system.

Figure 4:
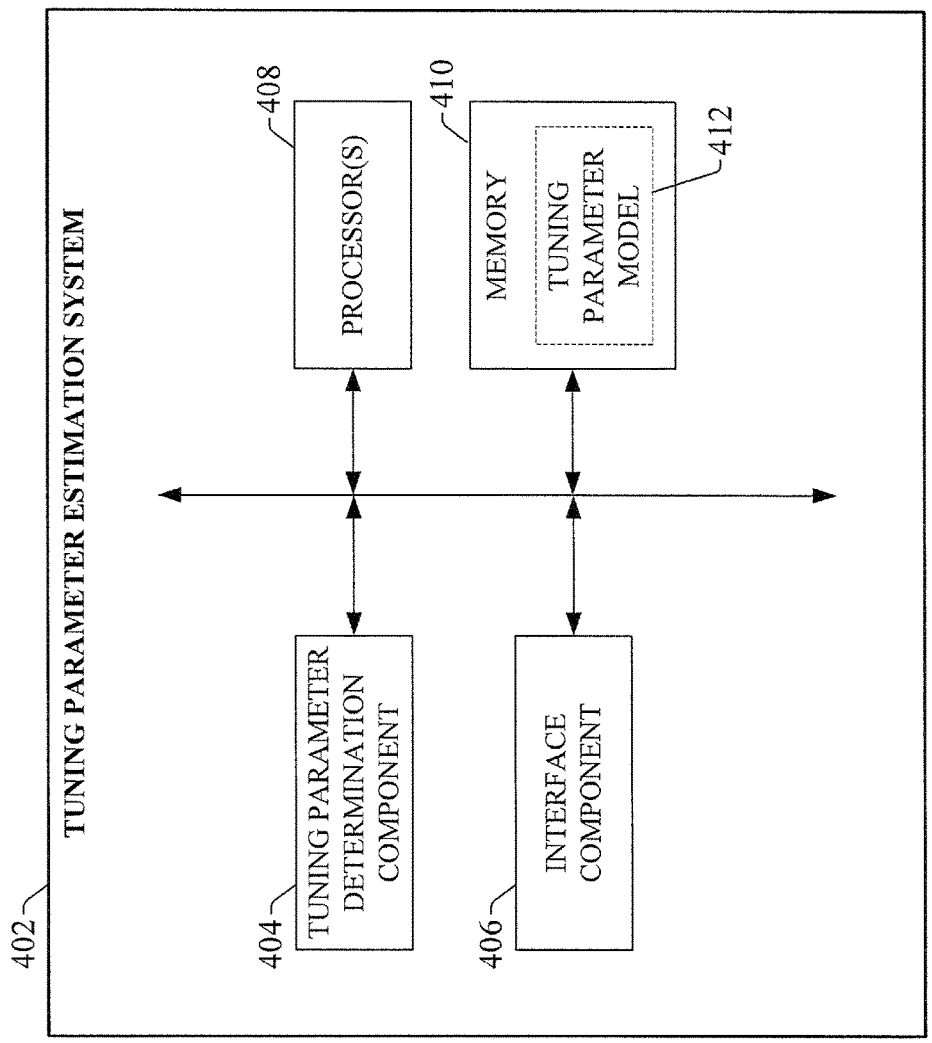
FIG. 4 is a block diagram of an example tuning parameter estimation system capable of determining robustly stabilizing tuning parameters for systems having high dead times based on a system's gain and one or more dominant constraints.

FIG. 4 is a block diagram of an example tuning parameter estimation system capable of determining robustly stabilizing tuning parameters for systems having long dead times based on a system's gain and one or more system parameters. Tuning parameter estimation system 402 can comprise a tuning parameter determination component 404, an interface component 406, one or more processors 408, and memory 410. Memory 410 can store a pre-computed tuning parameter model 412 that defines a functional relationship between tuning parameters ($\omega_o$, and $b_0$) and system parameters (k, τ, $T_d$). In various embodiments, one or more of the tuning parameter determination component 404, interface component 406, the one or more processors 408, and memory 410 can be electrically and/or communicatively coupled to one another to perform one or more of the functions of the controller bandwidth estimator 402. In some embodiments, components 404 and 406 can comprise software instructions stored on memory 410 and executed by processor(s) 408. The tuning parameter estimation system 402 may also interact with other hardware and/or software components not depicted in FIG. 4. For example, processor(s) 408 may interact with one or more external user interface device, such as a keyboard, a mouse, a display monitor, a touchscreen, or other such interface devices.

Interface component 406 can be configured to receive user input and to render output to the user in any suitable format (e.g., visual, audio, tactile, etc.). User input can be, for example, manually provided values of a system gain k, time constant τ, and dead time $T_d$ for a system or process to be controlled. These system parameters can be used by the tuning parameter estimation system 402 to determine suitable tuning parameters (bandwidth $\omega_o$ and estimated system gain $b_0$). Tuning parameter determination component 404 can receive values of the system parameters—system gain k, time constant τ, and dead time $T_d$—and reference tuning parameter model 412 to determine a suitable bandwidth and system gain estimate given the provided system parameters. The system parameters k, τ, and $T_d$ can be provided manually via interface component 404 or determined automatically and provided to the tuning parameter estimation system 402.

The one or more processors 408 can perform one or more of the functions described herein with reference to the systems and/or methods disclosed. Memory 410 can be a computer-readable storage medium storing computer-executable instructions and/or information for performing the functions described herein with reference to the systems and/or methods disclosed.

Figure 5:
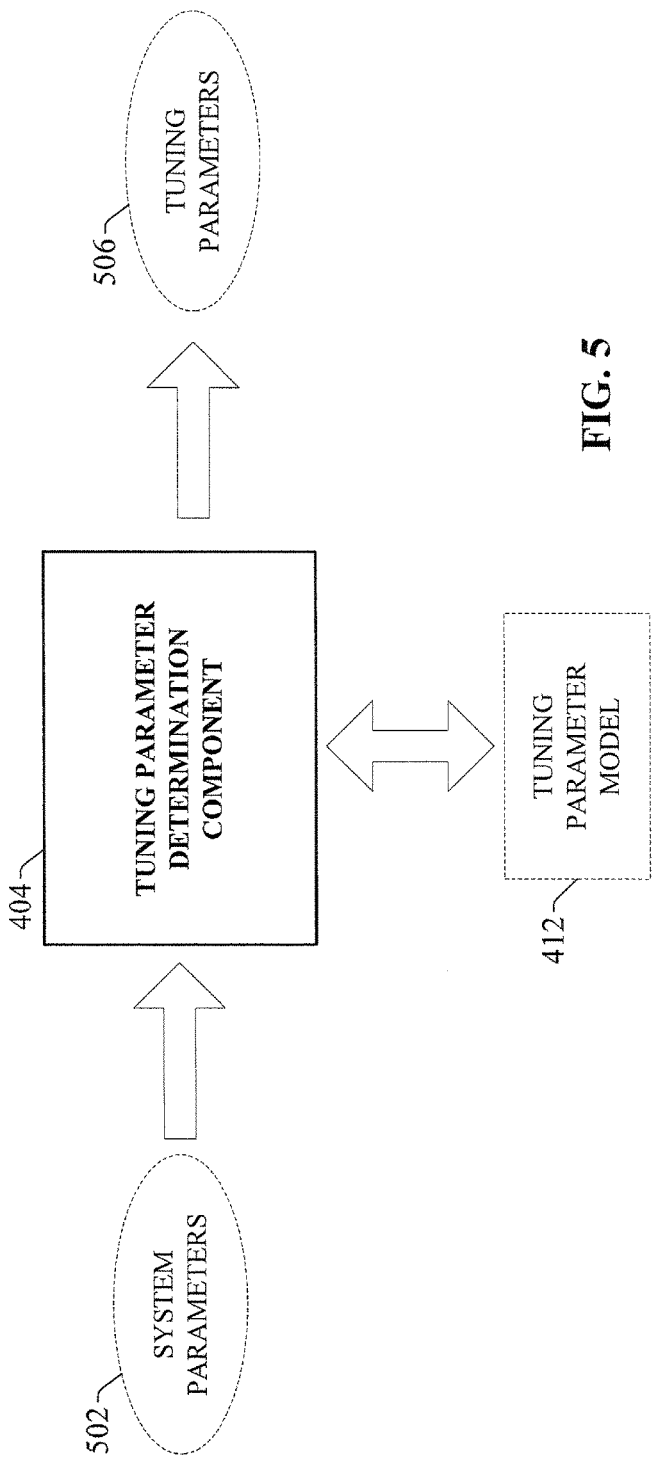
FIG. 5 is a block diagram illustrating example inputs and outputs associated with a tuning parameter determination component.

FIG. 5 is a block diagram illustrating example inputs and outputs associated with tuning parameter determination component 404. According to one or more embodiments, a tuning parameter model 412 can be derived that models a relationship between robustly stabilizing tuning parameter values for a controller and dominant system parameters for the system to be controlled using the controller. The relationship defined by tuning parameter model 412 can be derived using any suitable stability analysis method, including but not limited to robust stability analysis and optimization. Since the defined relationship is applicable over a range of respective values for system gain k, time constant $\tau$, and dead time $T_d$, tuning parameter model 412 can be used to determine suitable controller tuning parameters for a large number of control systems (e.g., motion control system, process control systems, etc.) having different degrees of dead time. Given the fixed relationships embodied by tuning parameter model 412, tuning parameter determination component 404 requires only estimated values of the system parameters 502 to determine suitable tuning parameters 506 for a given motion control or process control application. These tuning parameters 506 can then be used to tune the controller for robust stable performance given the system's long dead time or phase lag.

Since adjustment of the system gain estimate $b_0$ used in the ADRC control law can influence undesired oscillations in systems having large dead times or phase lags, tuning parameter determination component 404 can be configured to generate, as the tuning parameters, a system gain estimate $b_0$ and controller bandwidth $\omega_o$ as a function of system gain k $$\left(\text{where } k = \frac{b}{a}\right),$$

time constant $\tau$, and dead time $T_d$ (see the FOPDT system represented by equation (7)). To this end, the relationships represented by tuning parameter model 412 can be established by applying a robust control framework.

Figure 6:
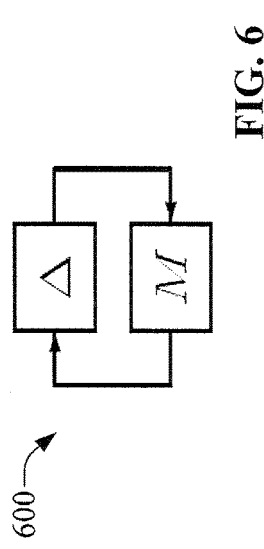
FIG. 6 is a representation of a A-M interconnection representing a closed-loop system in a robust control framework.

As noted above, a $1^{st}$ order system including a dead time can be described using transfer function (7). Using a robust control framework and maintaining a constant ratio between $\omega_o$ and $\omega_c$, the closed-loop can be represented by A-M interconnection 600 illustrated in FIG. 6, where M represents the closed-loop system as a function of the controller bandwidth $\omega_o$ and estimated system gain $b_0$ (the design parameters), and $\Delta$ is the uncertainty due to variations inherent in the estimation of the parameters $\tau$ and $T_d$.

Given the above, a functional approximation of achievable controller bandwidths $\omega_o$ and system gain estimates $b_0$ for a range of k, $\tau$, and $T_d$ values can be derived. This functional approximation forms the basis for tuning parameter model 412. For example, for a given range of system parameter values k, $\tau$, and $T_d$, an iterative search algorithm can be developed to find values of the controller bandwidth $\omega_o$ and system gain estimate $b_0$ that satisfy a robust stability constraint. In one or more embodiments, the stability criteria can be given by the structured singular value (SSV), known as mu-analysis, such that robust stability is guaranteed if:

$$\mu_1((M) < 1 \tag{8}$$

In an example system, the iterative search algorithm can determine robustly stabilizing values of the controller bandwidth $\omega_o$ and system gain estimate $b_0$ over a range of system parameter values for k, $\tau$, and $T_d$ to satisfy an optimization criterion. The range of (k, $\tau$, $T_d$) over which the iterative search algorithm is performed can be selected to generally conform to the range of reasonable uncertainties for the type of motion system or process being examined. Once the iterative search algorithm has yielded a set of achievable controller bandwidths $\omega_o$ and system gain estimates $b_0$ for a range of system parameters, curve fitting techniques (e.g., least squares or other such techniques) can be applied to the resulting set of values to obtain an approximate functional relationship between system parameters (k, $\tau$, $T_d$) and robustly stabilizing tuning parameters ($b_0$, $\omega_o$).

Using these techniques, a generalized function for robustly stabilizing tuning parameters ($b_0$, $\omega_o$) is derived as a function of only three system parameters—system gain k, time constant $\tau$, and dead time $T_d$—as represented by the following functional form:

$$[b_0, \omega_o] = f(k, \tau, T_d) \tag{9}$$

Figure 7:
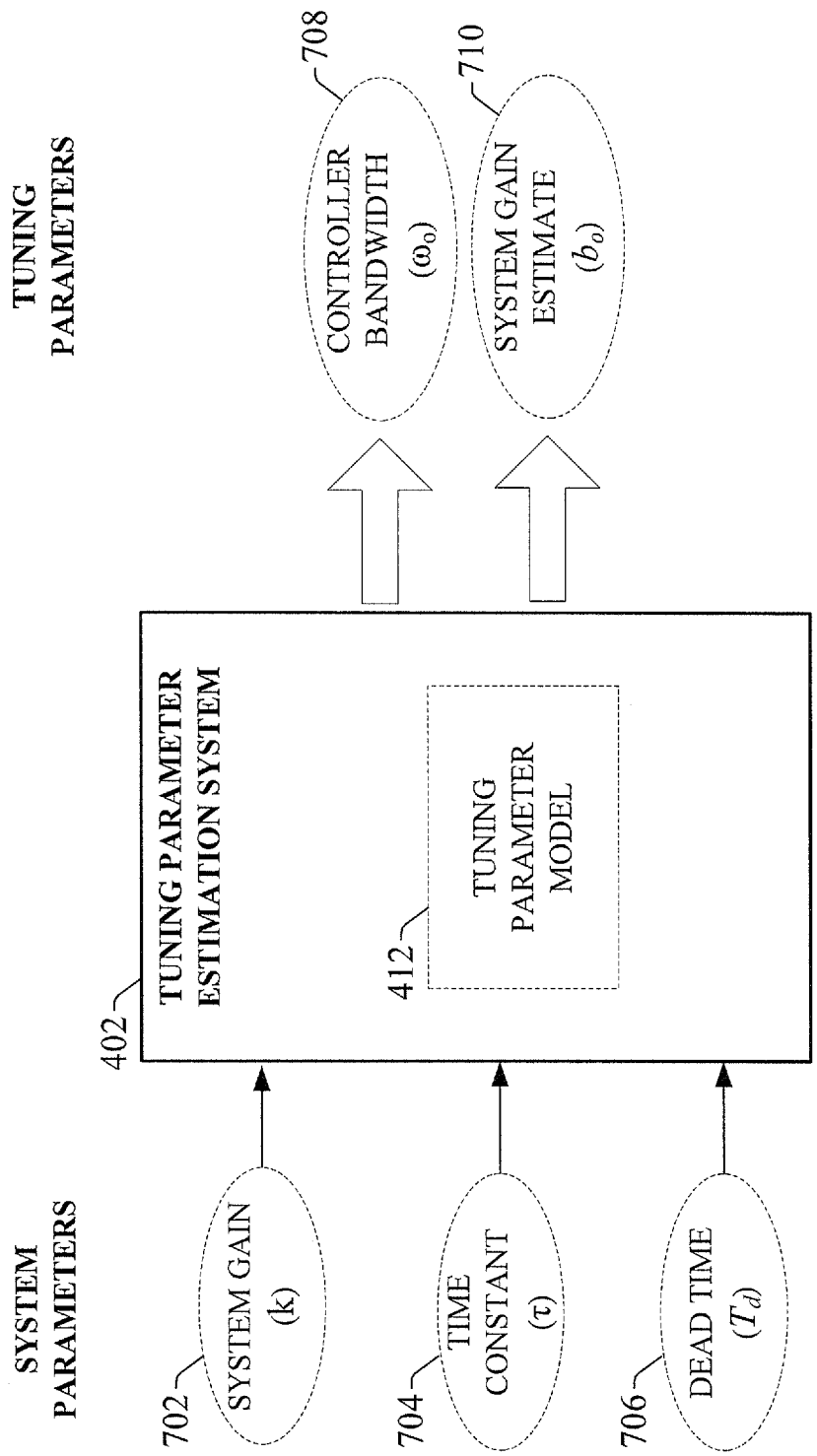
FIG. 7 is a block diagram illustrating derivation of robustly stabilizing tuning parameters using a tuning parameter estimation system.

Once a functional relationship between achievable robustly stabilizing tuning parameters and the system's dominant parameters is obtained (as exemplified by relationship (9)), this relationship forms the basis of bandwidth model 412. That is, the derived relationship can be stored as bandwidth model 412 and subsequently accessed by the tuning parameter determination component 404 to determine suitable robustly stabilizing tuning parameters for a given motion or process control application given only the system gain and dominant constraints. FIG. 7 illustrates an example derivation of robustly stabilizing tuning parameters according to one or more embodiments. Following from the previous example, tuning parameter model 412 encodes functional relationship (9) derived above, which defines robustly stabilizing tuning parameters ($b_0$, $\omega_o$) as a function of system gain k, time constant $\tau$, and dead time $T_d$. Tuning parameter model 412 can be stored in any suitable format for access by tuning parameter determination component 404 (e.g., a lookup table that cross-references values of k, $\tau$, and $T_d$ values of tuning parameters $b_0$ and $\omega_o$; a formula that can be fed values of the system parameters to facilitate calculation of the tuning parameters, etc.).

A system designer can feed estimated or measured values for a given system's gain 702, time constant 704, and dead time 706 to the tuning parameter estimation system 402. Given these system parameter values, tuning parameter determination component 404 can reference tuning parameter model 412 to determine a suitable controller bandwidth 708 and system gain estimate 710 corresponding to the estimated values 702, 704, and 706. Controller bandwidth 708 and system gain estimate 710 represent suitable tuning parameters defined by tuning parameter model 412 as providing robust stability for the system given system parameters 702, 704, and 706. These tuning parameters 708 and 710 can be used by the system designer to tune the controller for robust performance and stability. For example, the values of $\omega_o$ and $b_0$ can be used to tune a controller with an ESO and control law represented by equations (4) and (5), respectively.

In some scenarios, the tuning parameter estimation system 402 may output the determined values of $\omega_o$ and $b_0$ to a display (e.g., via interface component 406) so that the tuning parameter values can be viewed and entered into a separate motion control or tuning application. In some embodiments, the tuning parameter estimation system 402 may provide the prescribed tuning parameter values directly to a motion or process controller for tuning.

By leveraging the techniques described above, embodiments of the tuning parameter estimation system can eliminate manual trial-and-error tuning and enhance closed loop performance for systems with a relatively long dead time or phase lag. Moreover, since the tuning parameter estimation system simplifies the robustness functional form by describing robustly stabilizing tuning parameters as a function of the system parameters, system designers need not tune a controller to a conservatively low bandwidth in order to guarantee robust stability. The functional relationship between tuning parameters and system parameters given by functional relationship (9) is relatively static across the range of reasonable uncertainties. Hence, bandwidth model 412 can be easily implemented in a range of embedded control applications to facilitate robust and simplified controller design.

Figure 8:
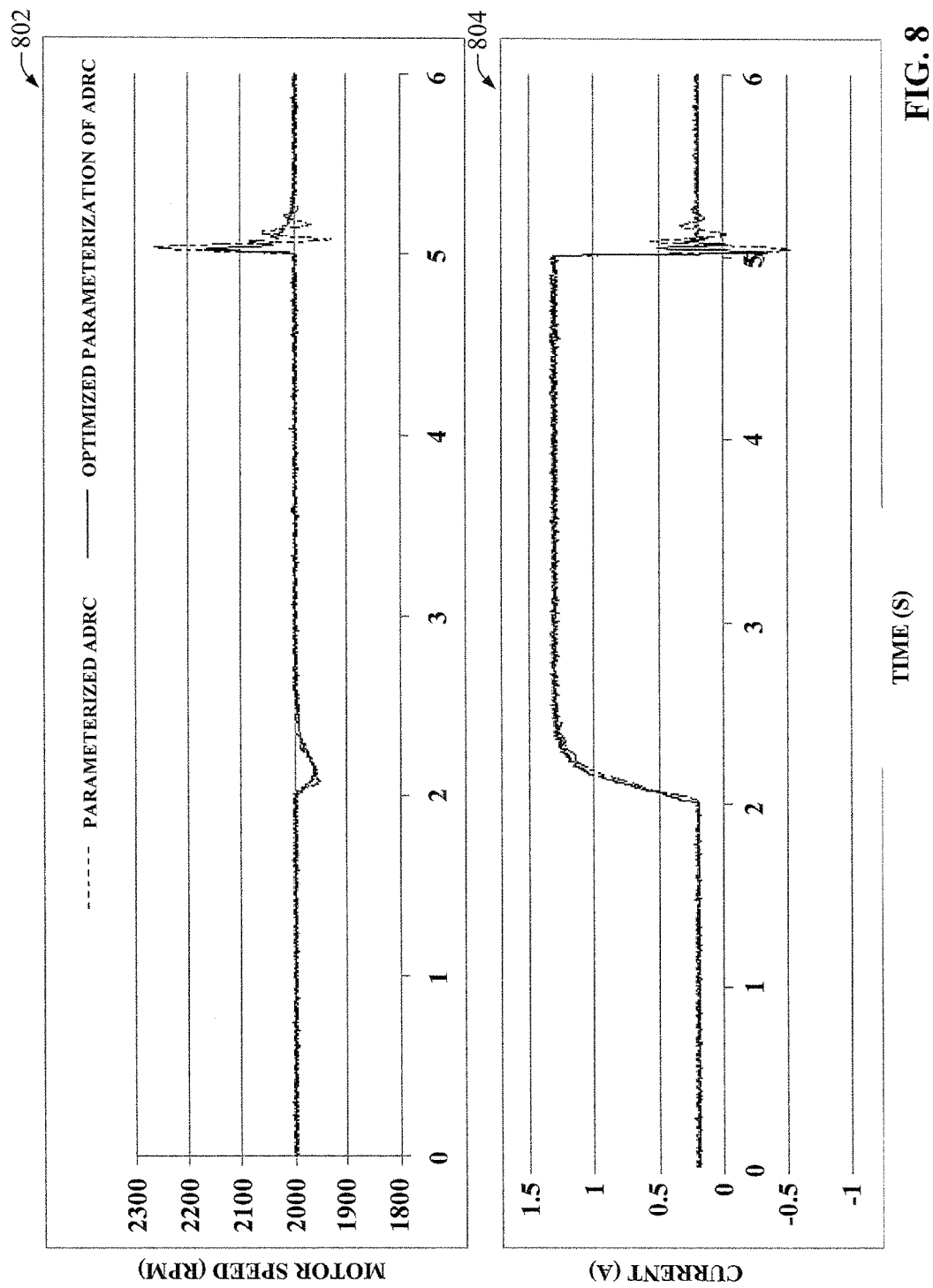
FIG. 8 is a pair of graphs comparing performance of a normal parameterized ADRC controller and an optimized parameterized ADRC controller tuned using a tuning parameter estimation system for a motion control application.

FIG. 8 is a pair of graphs comparing performance of a normal parameterized ADRC controller and an optimized parameterized ADRC controller tuned using the techniques described above. The graphs of FIG. 8 represent a scenario similar to that of FIG. 2, in which step disturbance is first applied to a motor shaft in a sensorless motor control application at the two-second mark, and is then removed at the five-second mark. The dashed line in graph 802 represents the motor speed in the normal parameterized ADRC case (similar to the plot of FIG. 2), while the solid line represents the motor speed when the controller has been tuned using, as the tuning parameters, the controller bandwidth $\omega_o$ and system gain estimate $b_0$ prescribed by the tuning parameter estimation system 402 based on the relationships defined by tuning parameter model 412. As shown in graph 802, the optimized parameterized ADRC scenario eliminates most of the oscillation associated with removal of the disturbance at the five-second mark relative to the normal parameterized ADRC scenario. The optimized parameterized ADRC scenario also yields a smoother control signal during disturbance transitions, as shown in graph 804.

Figure 9:
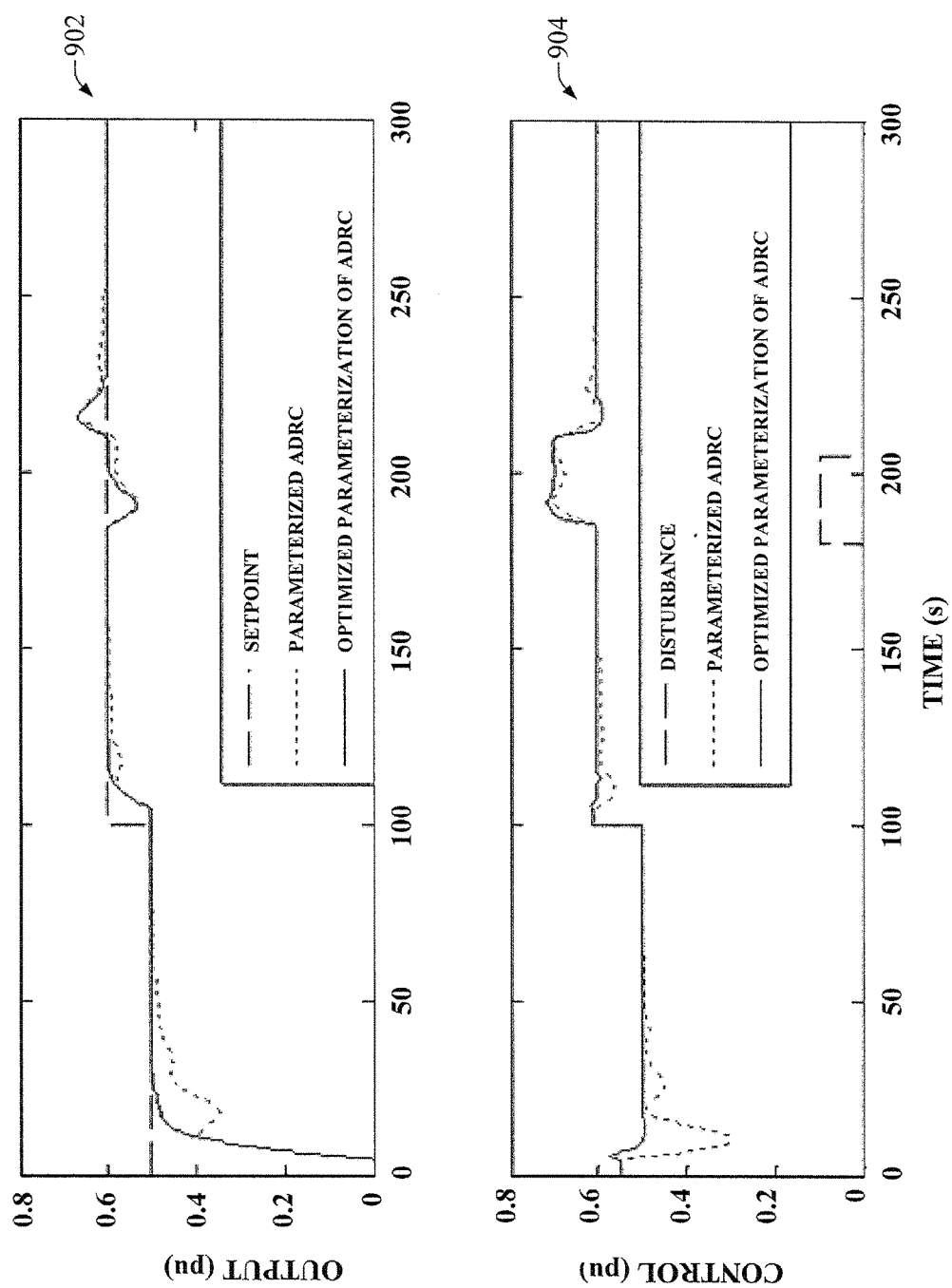
FIG. 9 is a pair of graphs comparing normal parameterized ADRC control with an optimized parameterized ADRC controller for a process control application.

FIG. 9 is a pair of graphs comparing normal parameterized ADRC control with the optimized parameterization of ADRC for the process control scenario described above in connection with FIG. 3. As shown on these graphs, both the controlled process variable (plotted on graph 902) and the control signal (plotted on graph 904) are less oscillatory in response to setpoint changes and step disturbances when the controller is tuned using the controller bandwidth $\omega_o$ and system gain estimate be generated by the tuning parameter estimation system 402.

Figure 10:
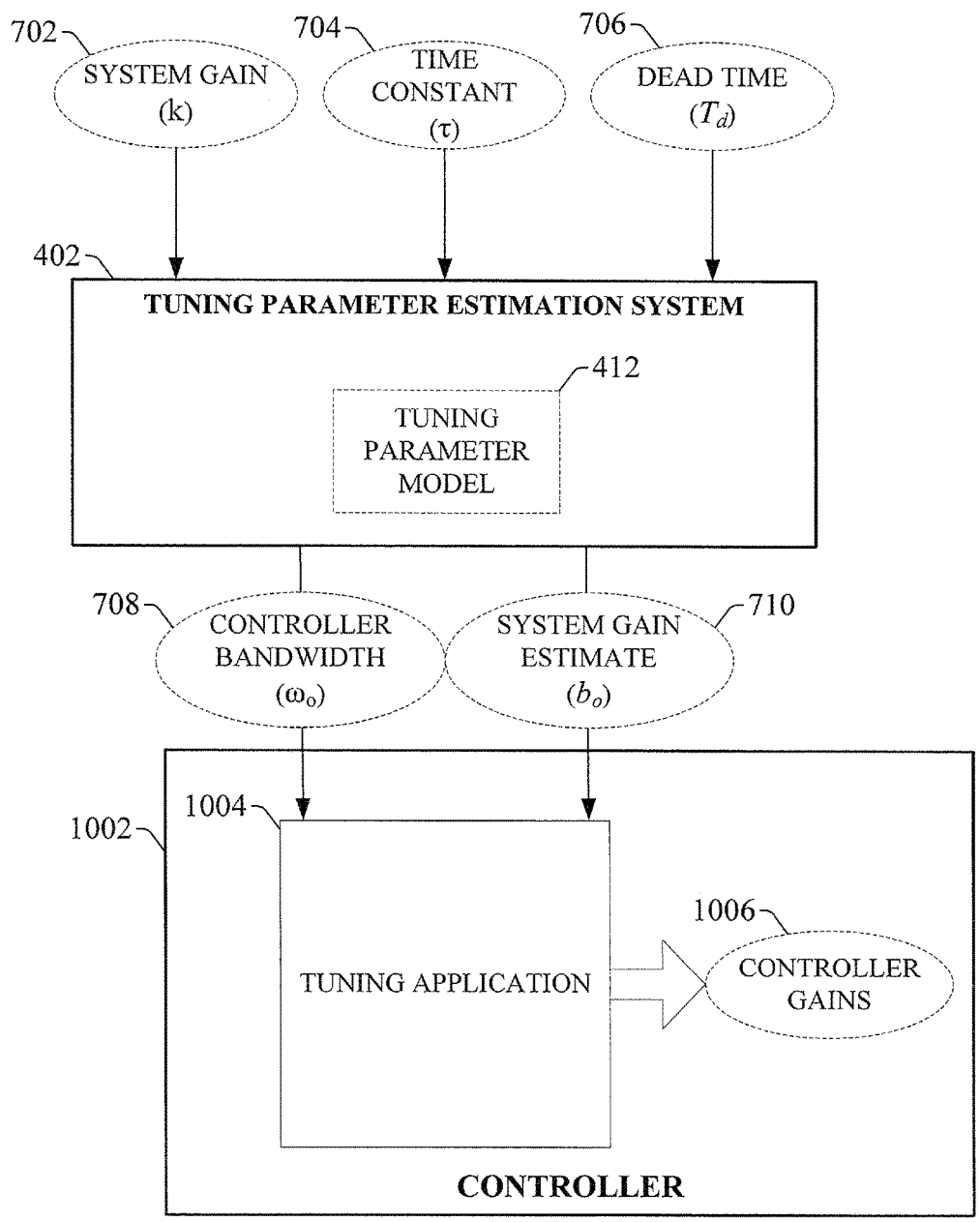
FIG. 10 is a block diagram of an example motion control tuning application that utilizes robustly stabilizing tuning parameters generated by a tuning parameter estimation system.

FIG. 10 illustrates an example motion control tuning application that utilizes the robustly stabilizing tuning parameters generated by the subject tuning parameter estimation system. In this example, a tuning application 1004 is used to tune controller gains 1006 for controller 1002, where the controller 1002 controls operation of a motor-driven motion system or a process control system (not shown). Tuning parameter estimation system 402 can determine a suitable controller bandwidth ($\omega_o$) 708 and system gain estimate ($b_0$) 710 for controller 1002 according to the techniques described above. For example, tuning parameter estimation system 402 can be provided with estimates of the system gain (k) 702, time constant ($\tau$) 704, and dead time ($T_d$) 706 of the controlled mechanical system. In one or more embodiments, these estimated system parameters can be determined independently by the system designer and fed to tuning parameter estimation system 402 manually. In other embodiments, one or more of the system parameters k, $\tau$, and $T_d$ can be estimated automatically or semi-automatically using any suitable system parameter measurement system and subsequently provided to the tuning parameter estimation system 402.

Tuning parameter estimation system 402 can then determine a suitable controller bandwidth 708 and system gain estimate 710 for the system characterized by system gain 702, time constant 704, and dead time 706 by referencing tuning parameter model 412, which has been derived a priori (e.g., using techniques described above) and which defines a functional relationship between robustly stabilizing tuning parameters ($\omega_o$ and $b_0$) and system parameters k, $\tau$, and $T_d$.

Once a suitable controller bandwidth 708 and system gain estimate 710 have been determined, tuning parameter estimation system 402 can provide these values to the tuning application 1004. Alternatively, tuning parameter estimation system 402 can render the estimated controller bandwidth 708 and system gain estimate 710 on a user interface, allowing a user to manually enter these values into the tuning application 1104. Tuning application 1104 can then set one or more controller gains 1106 based on the provided values for the controller bandwidth 708 and system gain estimate 710. For ADRC controllers, only the controller bandwidth $\omega_o$ and system gain estimate $b_0$ need to be optimized to facilitate tuning the controller 1002 for robust stable control, thereby simplifying the process of tuning of the control loop.

In some applications, the tuning parameter estimation system described herein can be used to determine robustly stabilizing tuning parameters during initial deployment of the motion or process control system, prior to normal operation. Specifically, the tuning parameter estimation system can be used in connection with configuring and tuning the controller prior to runtime. Once set, the bandwidth and system gain estimate typically remain fixed after system startup unless it is decided to re-tune the system at a later time. However, in some embodiments, the tuning parameter estimation system can be configured to automatically re-calculate suitable tuning parameters periodically or continuously during runtime. Using such configurations, controller parameters that are based on the controller bandwidth and system gain estimate values can be dynamically adjusted during normal operation, substantially in real-time, to compensate for gradual changes to the motion system's mechanical properties (e.g., as a result of mechanical wear and tear, changes to the load seen by a motor, etc.), which may result in changes in the system's overall dead time or other performance characteristics.

In various embodiments, the tuning parameter estimation system may be embodied as a stand-alone system, or may be an integrated component of a control device (e.g., an industrial controller, a microcontroller, a motor drive, a system-on-chip, etc.). The tuning parameter estimation system may also be embodied as a component of a controller program development platform; e.g., as a functional plug-in component of the development platform, as an instruction block included in a library of available function blocks for selection by a program developer, etc.

Figure 11:
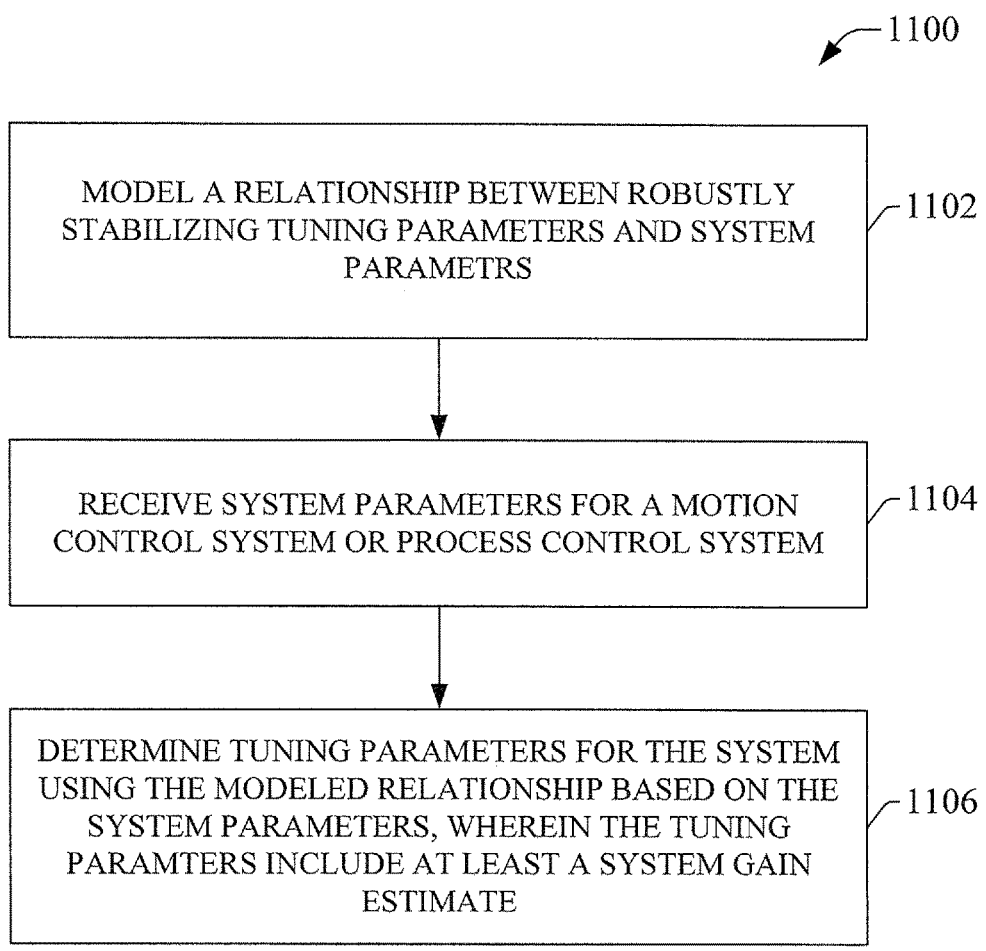
FIG. 11 is a flowchart of an example methodology for determining robustly stabilizing tuning parameters given only values of the system gain and dominant system constraints of a controlled system.
Figure 12:
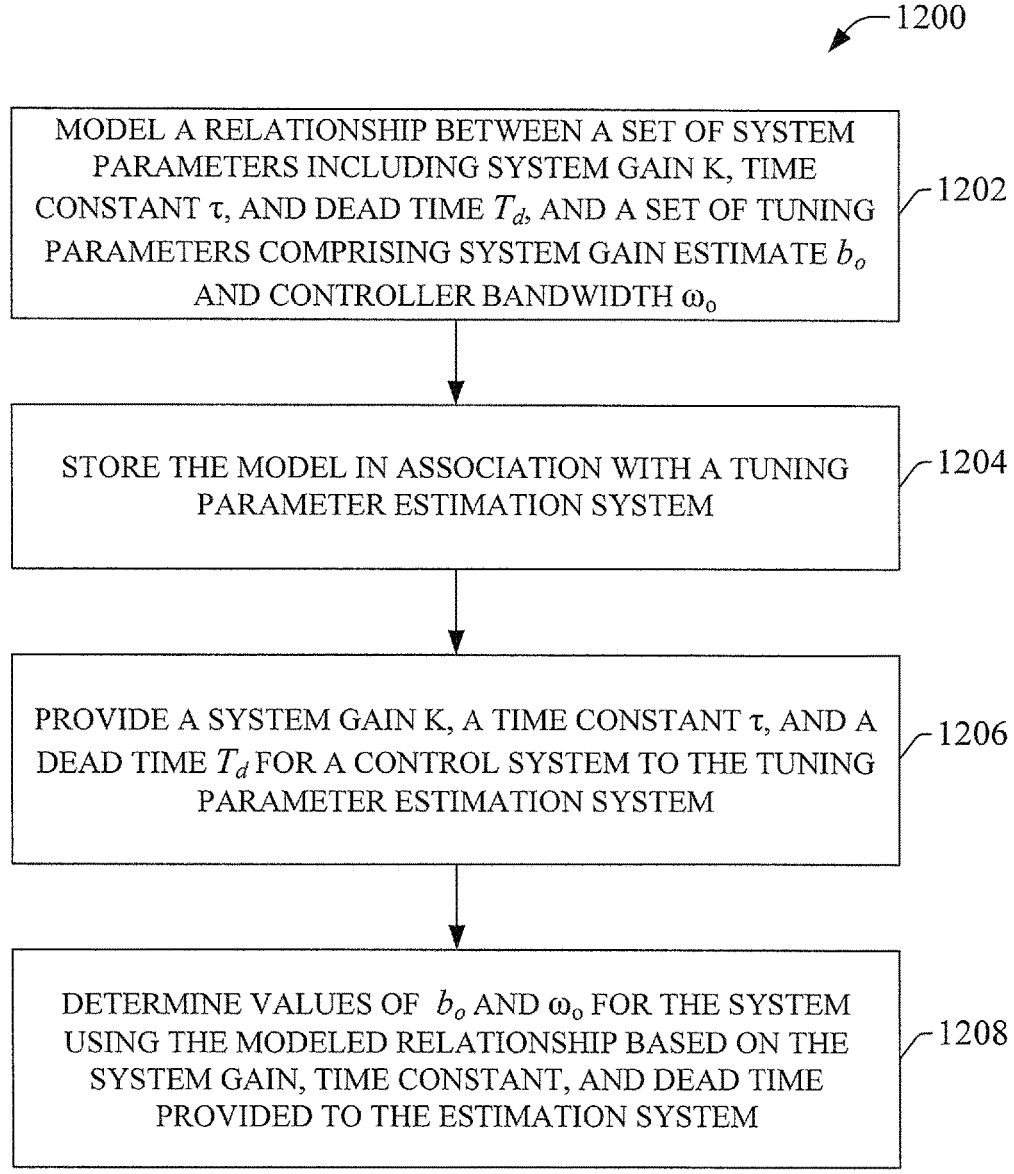
FIG. 12 is a flowchart of an example methodology for determining robustly stabilizing tuning parameters as a function of system dead time.

FIGS. 11-12 illustrate various methodologies in accordance with certain disclosed aspects. While, for purposes of simplicity of explanation, the methodologies are shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on an article of manufacture to facilitate transporting and transferring such methodologies to computers.

FIG. 11 illustrates an example methodology 1100 for determining robustly stabilizing tuning parameters given values of the system parameters of a controlled system (e.g., a motion control or process control system). Initially, at 1102, a relationship between robustly stabilizing tuning parameters and one or more dominant system parameters, which constrain the tuning parameters, is modeled for a range of reasonable uncertainties. At 1104, system parameters (e.g., a system gain, a system dead time, a time constant, etc.) for a given motion control system or process control system are received. The system parameters may be received via manual input, or may be received from an estimation system that generates estimates of the system parameters based on observed system response. At 1106, robustly stabilizing tuning parameters for the control system characterized by the system parameters received at step 1104 are determined using the modeled relationship created at step 1102. In particular, the tuning parameters are obtained by providing only the estimated or measured system parameters. The tuning parameters include at least a system gain estimate $b_0$. Although $b_0$ is typically only considered as a system parameter, methodology 1100 uses $b_0$ as a tuning parameter to at least partially alleviate performance problems (e.g., excessive system oscillations) due to long system dead times or phase lags.

FIG. 12 illustrates an example methodology 1200 for determining robustly stabilizing tuning parameters as a function of system dead time. Initially, at 1202, a relationship between robustly stabilizing tuning parameters is modeled as a function of system parameters, including system gain k, time constant $\tau$, and dead time $T_d$. The tuning parameters comprise controller bandwidth $\omega_o$ and system gain estimate $b_0$. At 1204, the model generated at step 1202 is stored in association with a tuning parameter estimation system (e.g., as an expression or lookup table).

At 1206, values for a system gain k, time constant $\tau$, and dead time $T_d$ of a closed-loop system are provided to the tuning parameter estimation system. In one or more embodiments, these system parameters can be obtained independently by a system designer by any suitable means. Alternatively, the system parameters can be automatically or semi-automatically determined based on a measured response of the motion control or process control system to one or more test control signals. At 1208, system gain estimate $b_0$ and controller bandwidth $\omega_o$, for the motion control or process control system are determined using the modeled relationship derived at step 1202 based on the values of k, $\tau$, and $T_d$ provided at step 1206.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments of the video editing system described herein can be implemented in any computer system or environment having any number of memory or storage units (e.g., memory 410 of FIG. 4), and any number of applications and processes occurring across any number of storage units. This includes, but is not limited to, an environment with server computers and client computers deployed in a network environment or a distributed computing environment, having remote or local storage. For example, with reference to FIG. 4, the tuning parameter estimation component 404 and interface component 406 can be stored on a single memory 410 associated with a single device, or can be distributed among multiple memories associated with respective multiple devices. Similarly, tuning parameter estimation component 404 and interface component 406 can be executed by a single processor 408, or by multiple distributed processors associated with multiple devices.

Distributed computing provides sharing of computer resources and services by communicative exchange among computing devices and systems. These resources and services include the exchange of information, cache storage and disk storage for objects. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 13:
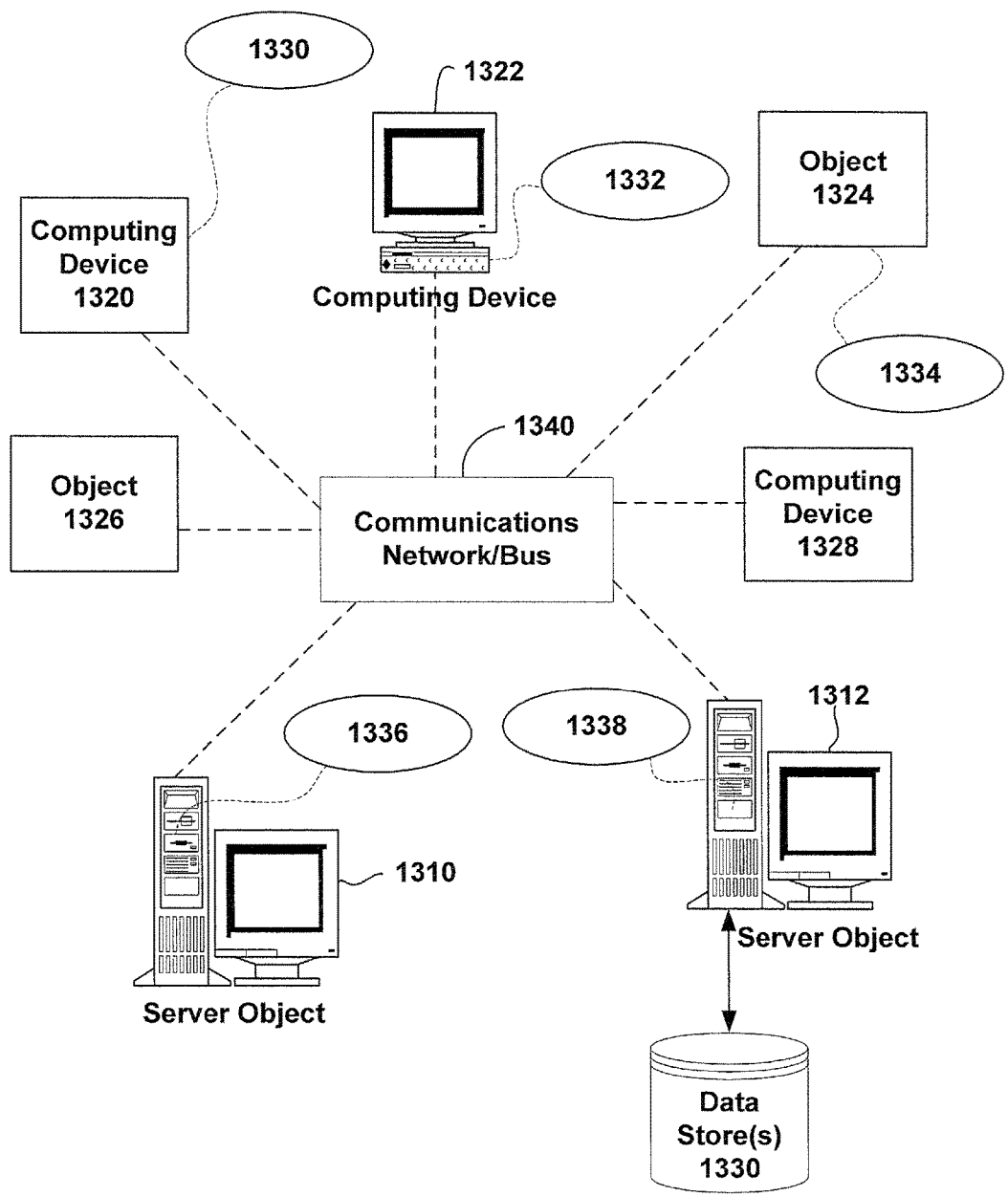
FIG. 13 is a block diagram representing an exemplary networked or distributed computing environment for implementing one or more embodiments described herein.

FIG. 13 provides a schematic diagram of an exemplary networked or distributed computing environment. The distributed computing environment includes computing objects 1310, 1312, etc. and computing objects or devices 1320, 1322, 1324, 1326, 1328, etc., which may include programs, methods, data stores, programmable logic, etc., as represented by applications 1330, 1332, 1334, 1336, 1338. It can be appreciated that computing objects 1310, 1312, etc. and computing objects or devices 1320, 1322, 1324, 1326, 1328, etc. may comprise different devices, such as personal digital assistants (PDAs), audio/video devices, mobile phones, MP3 players, personal computers, laptops, tablets, etc., where embodiments of the controller bandwidth estimator described herein may reside on or interact with such devices.

Each computing object 1310, 1312, etc. and computing objects or devices 1320, 1322, 1324, 1326, 1328, etc. can communicate with one or more other computing objects 1310, 1312, etc. and computing objects or devices 1320, 1322, 1324, 1326, 1328, etc. by way of the communications network 1340, either directly or indirectly. Even though illustrated as a single element in FIG. 13, communications network 1340 may comprise other computing objects and computing devices that provide services to the system of FIG. 13, and/or may represent multiple interconnected networks, which are not shown. Each computing object 1310, 1312, etc. or computing objects or devices 1320, 1322, 1324, 1326, 1328, etc. can also contain an application, such as applications 1330, 1332, 1334, 1336, 1338 (e.g., tuning parameter estimation system 402 or components thereof), that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 13, as a non-limiting example, computing objects or devices 1320, 1322, 1324, 1326, 1328, etc. can be thought of as clients and computing objects 1310, 1312, etc. can be thought of as servers where computing objects 1310, 1312, etc. provide data services, such as receiving data from client computing objects or devices 1320, 1322, 1324, 1326, 1328, etc., storing of data, processing of data, transmitting data to client computing objects or devices 1320, 1322, 1324, 1326, 1328, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1340 is the Internet, for example, the computing objects 1310, 1312, etc. can be Web servers, file servers, media servers, etc. with which the client computing objects or devices 1320, 1322, 1324, 1326, 1328, etc. communicate via any of a number of known protocols, such as the hypertext transfer protocol (HTTP). Computing objects 1310, 1312, etc. may also serve as client computing objects or devices 1320, 1322, 1324, 1326, 1328, etc., as may be characteristic of a distributed computing environment.

Exemplary Computing Device

Figure 14:
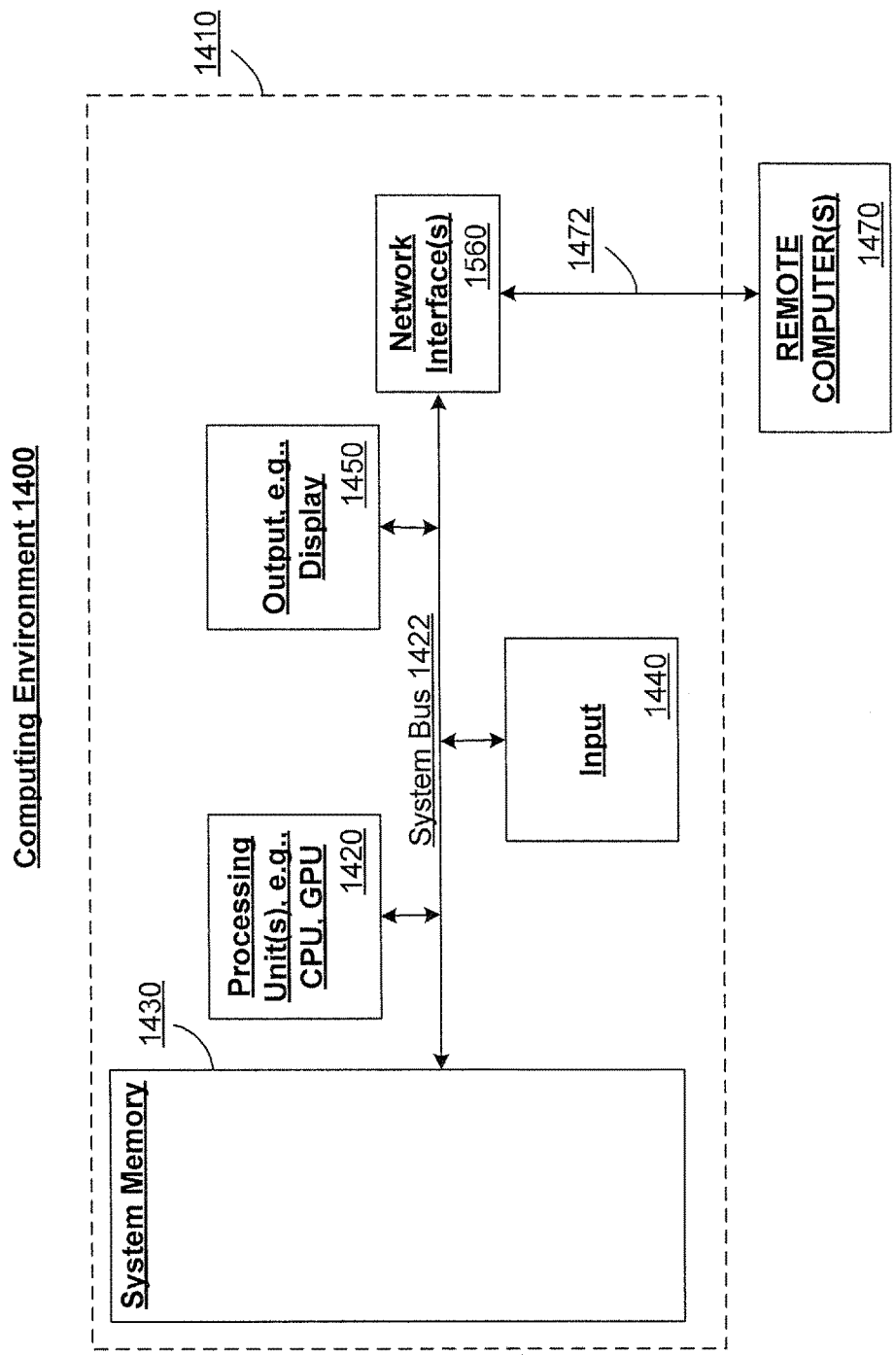
FIG. 14 is a block diagram representing an exemplary computing system or operating environment for implementing one or more embodiments described herein.

As mentioned, advantageously, the techniques described herein can be applied to any suitable device. It is to be understood, therefore, that handheld, portable and other computing devices and computing objects of all kinds are contemplated for use in connection with the various embodiments. Accordingly, the below computer described below in FIG. 14 is but one example of a computing device. Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 14 thus illustrates an example of a suitable computing system environment 1400 in which one or aspects of the embodiments described herein can be implemented, although as made clear above, the computing system environment 1400 is only one example of a suitable computing environment and is not intended to suggest any limitation as to scope of use or functionality. Neither is the computing system environment 1400 be interpreted as having any dependency or requirement relating to any one or combination of components illustrated in the exemplary computing system environment 1400.

With reference to FIG. 14, an exemplary computing device for implementing one or more embodiments in the form of a computer 1410 is depicted. Components of computer 1410 may include, but are not limited to, a processing unit 1420, a system memory 1430, and a system bus 1422 that couples various system components including the system memory to the processing unit 1420. Processing unit 1420 may, for example, perform functions associated with processor(s) 408 of tuning parameter estimation system 402, while system memory 1430 may perform functions associated with memory 410.

Computer 1410 typically includes a variety of computer readable media and can be any available media that can be accessed by computer 1410. The system memory 1430 may include computer storage media in the form of volatile and/or nonvolatile memory such as read only memory (ROM) and/or random access memory (RAM). By way of example, and not limitation, system memory 1430 may also include an operating system, application programs, other program modules, and program data.

A user can enter commands and information into the computer 1410 through input devices 1440, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 1410. A monitor or other type of display device is also connected to the system bus 1422 via an interface, such as output interface 1450. In addition to a monitor, computers can also include other peripheral output devices such as speakers and a printer, which may be connected through output interface 1450. In one or more embodiments, input devices 1440 can provide user input to interface component 406, while output interface 1450 can receive information relating to operations of tuning parameter estimation system 402 from interface component 406.

The computer 1410 may operate in a networked or distributed environment using logical connections to one or more other remote computers, such as remote computer 1470. The remote computer 1470 may be a personal computer, a server, a router, a network PC, a peer device or other common network node, or any other remote media consumption or transmission device, and may include any or all of the elements described above relative to the computer 1410. The logical connections depicted in FIG. 14 include a network 1472, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media (e.g., memory 410) and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in the numerous inferences described herein, components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In view of the exemplary systems described above, methodologies that may be implemented in accordance with the described subject matter will be better appreciated with reference to the flowcharts of the various figures (e.g., FIGS. 11 and 12). While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A method for determining tuning parameters, comprising:
   determining, by a system comprising a processor using an iterative search algorithm that maintains a constant ratio between an observer bandwidth and a controller bandwidth, sets of values of the controller bandwidth and a system gain estimate that satisfy a robust stability constraint for respective sets of values of a system gain, a time constant, and a dead time;
   applying, by the system, a curve-fitting method to the sets of values of the controller bandwidth and the system gain estimate to yield a tuning parameter model;
   receiving, by the system, system parameter values for a control system that controls a controlled system, the system parameter values comprising at least received values of the system gain, the time constant, and the dead time of the controlled system, wherein the control system comprises a controller having an extended state observer that is a function of the system gain estimate and the observer bandwidth, and having a control law that is a function of the system gain estimate and the controller bandwidth;
   referencing, by the system, the tuning parameter model;
   determining, by the system based on the referencing, robustly stabilizing values of the controller bandwidth and the system gain estimate for the control system based on the received values of the system gain, the time constant, and the dead time; and
   tuning, by the system, the control system using the robustly stabilizing values of the controller bandwidth and the system gain estimate as tuning parameters to facilitate stable performance of the control system.

2. The method of claim 1, wherein the tuning comprises tuning, using the robustly stabilizing values of the controller bandwidth and the system gain estimate determined by the system, the controller having the extended state observer represented by $$\dot{z} = Az + Bu + L(y - Cz)$$

and the control law represented by at least one of $$u = \frac{1}{b_0}(P(r - z_1) - z_2)$$

or $$u = \frac{1}{b_0}(P(r - y) - z_2)$$

where u is a system input, y is a system output, $$z = \begin{bmatrix} z_1 \\ z_2 \end{bmatrix}$$

is an extended state observer state vector, $z_1$ and $z_2$ are components of the extended state observer state vector, matrix $$L = \begin{bmatrix} 2\omega_o \\ \omega_o^2 \end{bmatrix},$$

$\omega_o$ is the observer bandwidth of the extended state observer, matrix $$A = \begin{bmatrix} 0 & 1 \\ 0 & 0 \end{bmatrix},$$

matrix $$B = \begin{bmatrix} b_0 \\ 0 \end{bmatrix},$$

matrix C=[1 0], P=$\omega_c$, $\omega_c$ is the controller bandwidth, and $b_0$ is the system gain estimate.

3. The method of claim 1, wherein the robust stability constraint is given by a structured singular value.

4. The method of claim 1, further comprising performing the receiving, the referencing, the determining, and the tuning periodically or substantially periodically during runtime of the control system.

5. The method of claim 1, wherein the receiving comprises at least one of receiving the system parameter values via manual input or receiving the system parameter values from an estimation system.

6. The method of claim 1, wherein the controlled system comprises at least one of an industrial robot, a positioning system, a pump, a spin dryer, a washing machine, a centrifuge, a conveyor, a palletizer, or a web tension control system.

7. The method of claim 1, wherein the tuning parameter model comprises at least one of an expression or a look-up table data structure that defines, as the sets of values of the controller bandwidth and the system gain estimate, values of the controller bandwidth and the system gain estimate as a function of the system gain, the time constant, and the dead time.

8. A system for determining robustly stabilizing tuning parameters, comprising:
a memory; and
a processor configured to execute executable components stored on the memory, the executable components comprising:
an interface component configured to receive system parameter values for a control system that controls a controlled system, wherein the system parameter values comprise at least values of a system gain, a time constant, and a dead time of the controlled system, and the control system comprises a controller having an extended state observer that is a function of a system gain estimate of the system gain and an observer bandwidth, and a control law that is a function of the system gain estimate and a controller bandwidth;
a tuning parameter determination component configured to
generate a tuning parameter model by identifying, based on an iterative search algorithm while maintaining a constant ratio between the observer bandwidth and the controller bandwidth, sets of values of the controller bandwidth and the system gain estimate that satisfy a robust stability constraint for respective sets of values of the system gain, the time constant, and the dead time, and applying a curve-fitting method to the sets of values of the controller bandwidth and the system gain estimate to yield the tuning parameter model and
determine robustly stabilizing values of the controller bandwidth and the system gain estimate as a function of the system parameter values based on a referencing of the tuning parameter model; and
a tuning component configured to tune the control system using the robustly stabilizing values of the controller bandwidth and the system gain estimate as tuning parameters to facilitate disturbance rejection for the control system.

9. The system of claim 8, wherein the tuning parameter model comprises at least one of an expression or a look-up table data structure that defines, as the sets of values of the controller bandwidth and the system gain estimate, values of the controller bandwidth and the system gain estimate as a function of the system gain, the time constant, and the dead time.

10. The system of claim 8, wherein the robust stability constraint is given by a structured singular value.

11. The system of claim 8, wherein the control system conforms to a transfer function represented by:

$$G(s) = \frac{k}{\tau s + 1} e^{-T_d s}$$

where s is a Laplace transform operator, k is the system gain, $\tau$ is the time constant, and $T_d$ is the dead time.

12. The system of claim 8, wherein the extended state observer is represented by $$\dot{z} = Az + Bu + L(y - Cz)$$

and the control law is represented by at least one of $$u = \frac{1}{b_0}(P(r - z_1) - z_2)$$

or $$u = \frac{1}{b_0}(P(r - y) - z_2)$$

where u is a system input, y is a system output, $$z = \begin{bmatrix} z_1 \\ z_2 \end{bmatrix}$$

is an extended state observer state vector, $z_1$ and $z_2$ are components of the extended state observer state vector, matrix $$A = \begin{bmatrix} 0 & 1 \\ 0 & 0 \end{bmatrix},$$

matrix $$B = \begin{bmatrix} b_0 \\ 0 \end{bmatrix},$$

matrix $$L = \begin{bmatrix} 2\omega_o \\ \omega_o^2 \end{bmatrix},$$

matrix C=[1 0], $\omega_o$ is the observer bandwidth of the extended state observer, $\omega_c$ is the controller bandwidth, $b_0$ is the system gain estimate, and $P = \omega_c$.

13. The system of claim 8, wherein the controlled system is at least one of an industrial robot, a positioning system, a pump, a spin dryer, a washing machine, a centrifuge, a conveyor, a palletizer, or a web tension control system.

14. The system of claim 8, wherein the tuning parameter determination component is configured to determine, as the robustly stabilizing values, values of the controller bandwidth and the system gain estimate defined in the tuning parameter model as corresponding to the system parameter values received by the interface component.

15. A non-transitory computer-readable medium having stored thereon executable instructions that, in response to execution, cause a computer system to perform operations, the operations comprising:
- generating a tuning parameter model, wherein the generating comprises:
  - determining, using an iterative search algorithm that maintains a constant ratio between an observer bandwidth and a controller bandwidth, sets of values of the controller bandwidth and a system gain estimate that satisfy a robust stability constraint for corresponding sets of values of a system gain, a time constant, and a dead time, and
  - applying a curve-fitting method to the sets of values of the controller bandwidth and the system gain estimate to yield the tuning parameter model;
- receiving system parameter values for a control system that controls a mechanical system, wherein the system parameter values comprise at least values of the system gain, the time constant, and the dead time of the mechanical system, and the control system comprises a controller having an extended state observer that is a function of the system gain estimate and the observer bandwidth, and a control law that is a function of the system gain estimate and the controller bandwidth;
- selecting, based on a referencing of the tuning parameter model, robustly stabilizing values of the controller bandwidth and the system gain estimate for the control system based on the system parameter values; and
- setting at least one controller gain coefficient for the control system using the robustly stabilizing values of the controller bandwidth and the system gain estimate as tuning parameters to facilitate stable performance of the control system.

16. The non-transitory computer-readable medium of claim 15, wherein the generating comprises generating the tuning parameter model based on a determination of robustly stabilizing values of the controller bandwidth and the system gain estimate corresponding to the respective sets of values of the system gain, the time constant, and the dead time.

17. The non-transitory computer-readable medium of claim 15, wherein the robust stability constraint is given by a structured singular value.

18. The non-transitory computer-readable medium of claim 15, wherein the tuning parameter model comprises at least one of an expression or a look-up table data structure that defines the robustly stabilizing values of the controller bandwidth and the system gain estimate as a function of the system gain, the time constant, and the dead time.

19. The non-transitory computer-readable medium of claim 15, wherein the operations further comprise performing the receiving, the selecting, and the tuning periodically or substantially periodically during runtime of the control system.

20. The non-transitory computer-readable medium of claim 15, wherein the mechanical system is at least one of an industrial robot, a positioning system, a pump, a spin dryer, a washing machine, a centrifuge, a conveyor, a palletizer, or a web tension control system.

* * * * *